(12) United States Patent
Dusanapudi et al.

(10) Patent No.: US 9,424,159 B2
(45) Date of Patent: Aug. 23, 2016

(54) PERFORMANCE MEASUREMENT OF HARDWARE ACCELERATORS

(71) Applicant: International Business Machines Corporation, Armonk, NY (US)

(72) Inventors: Manoj Dusanapudi, Bangalore (IN); Sairam Kamaraju, Bangalore (IN); Anil Krishna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/050,831

(22) Filed: Oct. 10, 2013

(65) Prior Publication Data

US 2015/0106816 A1    Apr. 16, 2015

(51) Int. Cl.
*G06F 11/34* (2006.01)

(52) U.S. Cl.
CPC ........ *G06F 11/3409* (2013.01); *G06F 11/3466* (2013.01); *G06F 11/3419* (2013.01); *Y02B 60/165* (2013.01)

(58) Field of Classification Search
CPC .................................................. G06F 9/4881
USPC ........................................................ 718/102
See application file for complete search history.

(56) References Cited

U.S. PATENT DOCUMENTS

| 5,146,460 | A | 9/1992 | Ackerman et al. |
| 6,925,424 | B2 | 8/2005 | Jones et al. |
| 7,292,957 | B1 | 11/2007 | Schell |
| 7,533,003 | B2 | 5/2009 | Floyd et al. |
| 7,702,887 | B1 | 4/2010 | Grohoski et al. |
| 7,836,447 | B2 | 11/2010 | Zheltov et al. |
| 8,869,160 | B2 * | 10/2014 | Dillenberger et al. ........ 718/104 |
| 8,970,607 | B2 * | 3/2015 | Harney et al. ................. 345/503 |
| 2002/0091817 | A1 | 7/2002 | Hill et al. |
| 2002/0188889 | A1 | 12/2002 | Phan |
| 2005/0183065 | A1 | 8/2005 | Wolczko et al. |
| 2008/0172548 | A1 | 7/2008 | Caprioli et al. |

(Continued)

FOREIGN PATENT DOCUMENTS

| CN | 102667724 A | 9/2012 |
| JP | 2011108140 A | 6/2011 |

OTHER PUBLICATIONS

PCT Search Report and Written Opinion, Dec. 31, 2014, PCT Application No. PCTCN2014087638, 11 pages.

(Continued)

*Primary Examiner* — Emerson Puente
*Assistant Examiner* — Charlie Sun
(74) *Attorney, Agent, or Firm* — Brandon C. Kennedy; Robert R. Williams; Kennedy Lenart Spraggins LLP (57) ABSTRACT

Performance measurement of hardware accelerators, where one or more computer processors are operably coupled to at least one hardware accelerator, and a computer memory is operatively coupled to the one or more computer processors, including operating by the one or more processors the accelerator at saturation, submitting data processing tasks by the processors to the accelerator at a rate that saturates the data processing resources of the accelerator, causing the accelerator to decline at least some of the submitted tasks; and while the accelerator is operating at saturation, measuring by the processors accelerator performance according to a period of time during which the accelerator accepts a plurality of submitted tasks.

11 Claims, 4 Drawing Sheets

(56) References Cited

U.S. PATENT DOCUMENTS

| | | | |
|---|---|---|---|
| 2009/0213127 A1 | 8/2009 | Krishnamurthy et al. | |
| 2012/0089979 A1 | 4/2012 | Adar et al. | |
| 2012/0089984 A1 | 4/2012 | Adar et al. | |
| 2012/0123739 A1 | 5/2012 | Sethumadhavan et al. | |
| 2012/0124588 A1 | 5/2012 | Sinha et al. | |
| 2012/0203754 A1* | 8/2012 | Biran et al. | 707/706 |
| 2013/0155861 A1* | 6/2013 | Bryers et al. | 370/235 |
| 2013/0346603 A1* | 12/2013 | Beyene | H04L 41/145 709/224 |
| 2014/0153422 A1* | 6/2014 | Nambiar et al. | 370/252 |
| 2014/0219084 A1* | 8/2014 | Nishikawa et al. | 370/230 |

OTHER PUBLICATIONS

Bose, P., "Ensuring Dependable Processor Performance: an Experience Report on Pre-Silicon Performance Validation", International Conference on Dependable Systems and Networks, 2001, Conference Location: Goteborg, Sweden, Jul. 1-4, 2001, pp. 481-86, IEEE, Doi: 10.1109/DSN.2001.941432.

Disclosed Anonymously, "Method and System to Optimize Virtualized Systems on Multi-Core Processor Using Performance Monitor Counters Feedback Loop", IP.com Electronic Publication: Dec. 1, 2010, IP.com No. IPCOM000202018D, pp. 1-13, ip.com, URL: http://ip.com/IPCOM/000202018.

* cited by examiner

PERFORMANCE MEASUREMENT OF HARDWARE ACCELERATORS

BACKGROUND OF THE INVENTION

1. Field of the Invention

The field of the invention is data processing, or, more specifically, methods, apparatus, and products for performance measurement of hardware accelerators.

2. Description of Related Art

General purpose processors have been the workhorses of computation, used to build uniprocessor systems, symmetric multiprocessor systems and chip multi-processor systems over the last several decades. While general purpose cores are designed to achieve the best "average" behavior across a collection of workloads, they are typically sub-optimal for each individual workload. Inherent inefficiencies of general purpose processing cores (introduced due to the constraints of industry standards and the design goal of good performance on average across a wide set of workloads) have been typically hidden over the last several decades thanks to exponential transistor density growth per unit area (Moore's Law) and constant power density per unit area (Dennard Scaling). The new reality is that while Moore's law continues providing ever increasing transistor counts per unit area, Dennard Scaling has slowed down significantly. This means performance growth using general purpose cores is only possible with super linear increase in chip and system power budget. Therefore, computing machinery of the future will be forced to move away from the energy inefficiencies of a general purpose computer towards specialized task-specific processors or accelerators. Specializing hardware cores for specific workloads gives a significant performance advantage, as well as a performance-per-watt advantage. Offloading certain tasks from the general purpose processor to the task-specific accelerator can result in execution speed-up (by orders of magnitude for the task, in some cases) while consuming less power compared to doing the same task on the general purpose processor.

Measuring the performance of an accelerator is used to validate accelerator design. It is a valuable tool in understanding design bottlenecks, guiding chip design, system design, and software design. However there is a significant challenge in making this measurement accurately. There are, typically, two ways that accelerator performance is measured. The first involves programming the performance counters (if available) in the accelerators. The second method uses software measurement tools to identify completion of work by an accelerator, followed by reading the timer register. The second approach is the preferred one—it is more general (works even when specific performance counters are unavailable), more reliable (no need to rely on a library that can program performance counters efficiently) and simpler (no need to learn the intricacies of the performance counters available, what they mean etc.). For example, during lab system bringup, often the performance counters are not readily available, at least they are not available to measurement tools. Even after becoming available, there are bugs to be resolved. In the meantime, the second approach continues to work. That said, the second approach relies on using measurement software that runs on the general purpose core and communicates with an accelerator.

These prior art approaches have problems. The software measurement tools must communicate with an accelerator (either directly or via memory) that is relatively far away—attached via an on-chip or off-chip interconnect. In addition, software must execute at least a handful of instructions to test completion of work by an accelerator, which take time to execute. Moreover, all post-completion measurement steps take time, leading to a best case measurement granularity—that is, the shortest time that software needs to test task completion. While these prior art techniques work when the completion rate of tasks at the accelerator is slower compared to this measurement granularity, often, the completion rate at the accelerator is much higher than the granularity available to a software measurement tool or application running on the general purpose core—after all, that is the whole point of acceleration, to go faster than any general-purpose core or processor. This is especially true of accelerators working on small amounts of data, such as for example, encryption of small Ethernet packets. In such a case, a subject task may have completed at the accelerator a statistically significant amount of time before a performance measurement tool is even able to probe and recognize that the task is completed.

SUMMARY OF THE INVENTION

Methods, apparatus, and products are described for performance measurement of hardware accelerators, where one or more computer processors are operably coupled to at least one hardware accelerator, and a computer memory is operatively coupled to the one or more computer processors, including operating by the one or more processors the accelerator at saturation, submitting data processing tasks by the processors to the accelerator at a rate that saturates the data processing resources of the accelerator, causing the accelerator to decline at least some of the submitted tasks; and while the accelerator is operating at saturation, measuring by the processors accelerator performance according to a period of time during which the accelerator accepts a plurality of submitted tasks.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
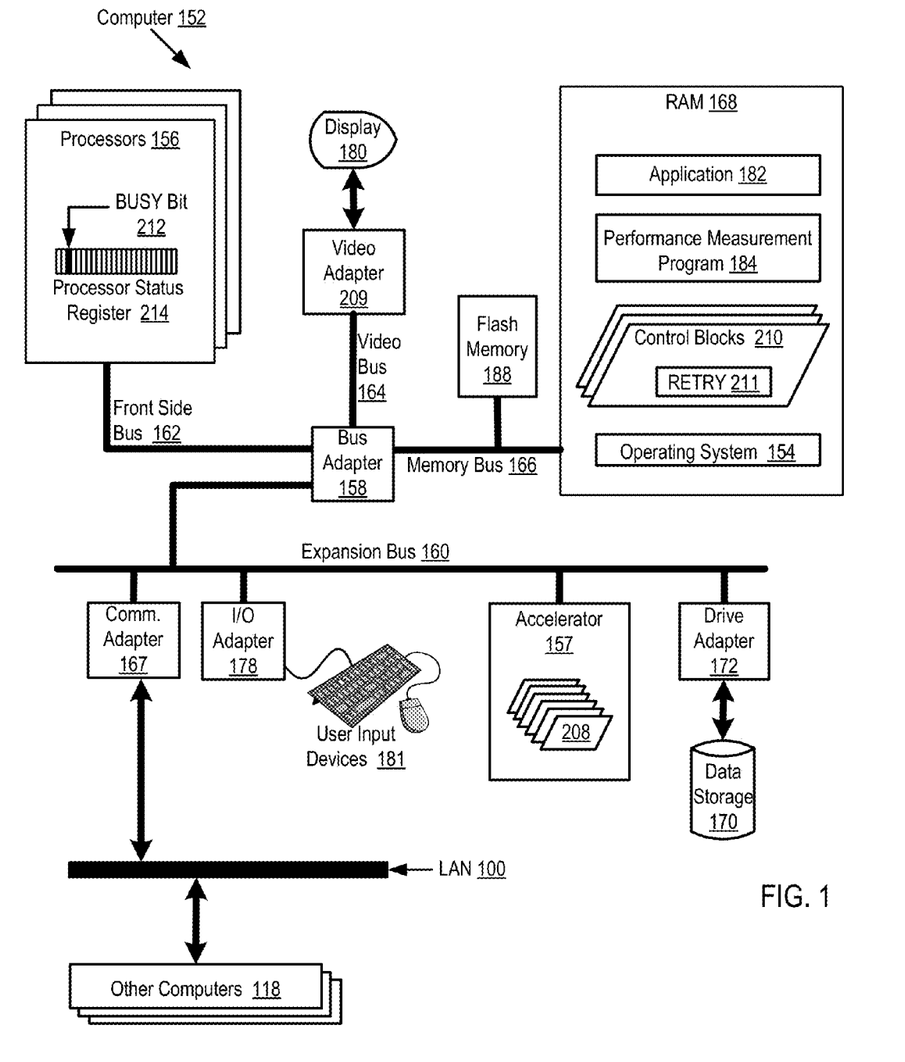
FIG. 1 sets forth a block diagram of automated computing machinery comprising an example computer useful in performance measurement of hardware accelerators.

Example methods, apparatus, and products for performance measurement of hardware accelerators in accordance with the present invention are described with reference to the accompanying drawings, beginning with FIG. 1. Performance measurement of hardware accelerators in accordance with the present invention is generally implemented with computers, that is, with automated computing machinery. FIG. 1 therefore sets forth a block diagram of automated computing machinery comprising an example computer (152) useful in performance measurement of hardware accelerators according to embodiments of the present invention. The computer (152) of FIG. 1 includes one or more computer processors (156) as well as random access memory (168) ('RAM') which is connected through a high speed memory bus (166) and bus adapter (158) to processor (156) and to other components of the computer (152). Processors (156) are referenced here as 'one or more computer processors,' although readers of skill will understand that some computers may measure accelerator performance with only a single processor, while other computers that measure accelerator performance according to embodiments of the present invention will contain many processors, multiple compute cores among processors, multiple hardware threads of execution within multiple processors, and so on.

The example computer of FIG. 1 also includes a hardware accelerator (157). An accelerator or coprocessor may have similar capabilities as a general-purpose processor. Some accelerators can fetch instructions from memory, execute program flow control instructions, do input/output operations, manage memory, and so on. Accelerators do typically, however, require a host or main processor, a general-purpose processor, to fetch accelerator instructions and handle other operations aside from acceleration functions as such. For clarity in this specification, general-purpose processors are referred to as 'processors,' and specialized co-processors are referred to as 'accelerators.' Accelerators adaptable for performance measurement according to embodiments of the present invention include floating point arithmetic co-processors, graphics engines, video adapters, digital signal processors, high speed I/O interfaces, encryption accelerators, and so on. In the example of FIG. 1, the accelerator (157) is coupled to processors (156) through expansion bus (160), bus adapter (158), and front side bus (162), all of which is an example architecture only, for explanation, not for limitation. Readers will understand that some accelerators, math co-processors for example, are implemented directly on the same integrated circuit substrate with a general-purpose processor and couple to the processor through an on-chip interconnect. The video adapter (209) is an example of a video accelerator that is connected to the processors (157) through a special-purpose high-speed video bus (164) rather than the expansion bus (160). Other ways to interconnect accelerators and processors will occur to those of skill in the art, and all such ways are well within the scope of the present invention.

Stored in RAM (168) is an application program (182) that operates the processors (156) so that the processors submit data processing tasks (208) to the accelerator (157). Under application control, the processors measure accelerator performance by first operating the accelerator at saturation, that is, by submitting data processing tasks to the accelerator at a rate that saturates the data processing resources of the accelerator, causing the accelerator to decline at least some of the submitted tasks. RAM also contains accelerator control block (210), where each control block is a structure that represents and describes a task submitted to the accelerator. Each control block includes, for example, input buffer address, input buffer size, output buffer address, output buffer size, and status—including a RETRY indicator (211) such as a flag or memory bit which when set indicates that the accelerator has declined the task represented by the control block in which the RETRY flag is set to TRUE. As an alternative to the RETRY indicator (211), in some embodiments at least, the accelerator can signal that it has declined a submitted task by setting a BUSY bit (212) in a status register (214) on board one or more of the processors themselves. Other ways to implement an accelerator's indication of declining a submitted task may occur to those of skill in the art, and all such ways will be well within the scope of the present invention.

Also in RAM (168) in the example of FIG. 1 is a performance measurement program (184) that operates at least one of the processors (156), while the accelerator is operating at saturation, to measure accelerator performance according to a period of time during which the accelerator (157) accepts a plurality of submitted tasks (208). Readers of skill will wonder why the performance measurement program (184) is implemented as a separate program rather than a component of the application (182) using the accelerator for accelerator of data processing tasks. The answer is that it could; the performance measurement program could be implemented as a thread or subroutine within the application (182), although in many embodiments it will be implemented separately as shown here. The application (182) may be a standard application program, an accounting program or a computer game, that is useful for measuring accelerator performance because it is already set up to do so. So installing a performance measurement function within the application (182) might require altering the code of an existing program. Also remember that the whole point of the existence of the accelerator in the computer is that it is much faster than the processors; achieving saturated performance therefore, especially with relatively small tasks, may require multiple instances of the application running on multiple processors before the processors can submit tasks at a rate that saturates the accelerator. At the same time, such performance measurement of accelerator performance would still only need one instance of the performance measure program, so that having a separate performance measurement function within each instance of an application would probably not be the best use of resources.

Also stored in RAM (168) is an operating system (154). An operating system is a computer software component that is responsible for execution of applications programs and for administration of access to computer resources, memory, processor time, and I/O functions, on behalf of application programs. Operating systems useful performance measurement of hardware accelerators according to embodiments of the present invention include UNIX™, Linux™, Microsoft XP™, AIX™, IBM's i5/OS™, and others as will occur to those of skill in the art. The operating system (154), application (182), performance measurement program (184), and the control blocks (210) in the example of FIG. 1 are shown in RAM (168), but many such components typically are stored in non-volatile memory also, such as, for example, on a disk drive (170) or in flash memory (188).

The computer (152) of FIG. 1 includes a disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for performance measurement of hardware accelerators according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for performance measurement of hardware accelerators according to embodiments of the present invention include modems for wired dial-up communications, Ethernet (IEEE 802.3) adapters for wired data communications network communications, and 802.11 adapters for wireless data communications network communications.

Figure 2:
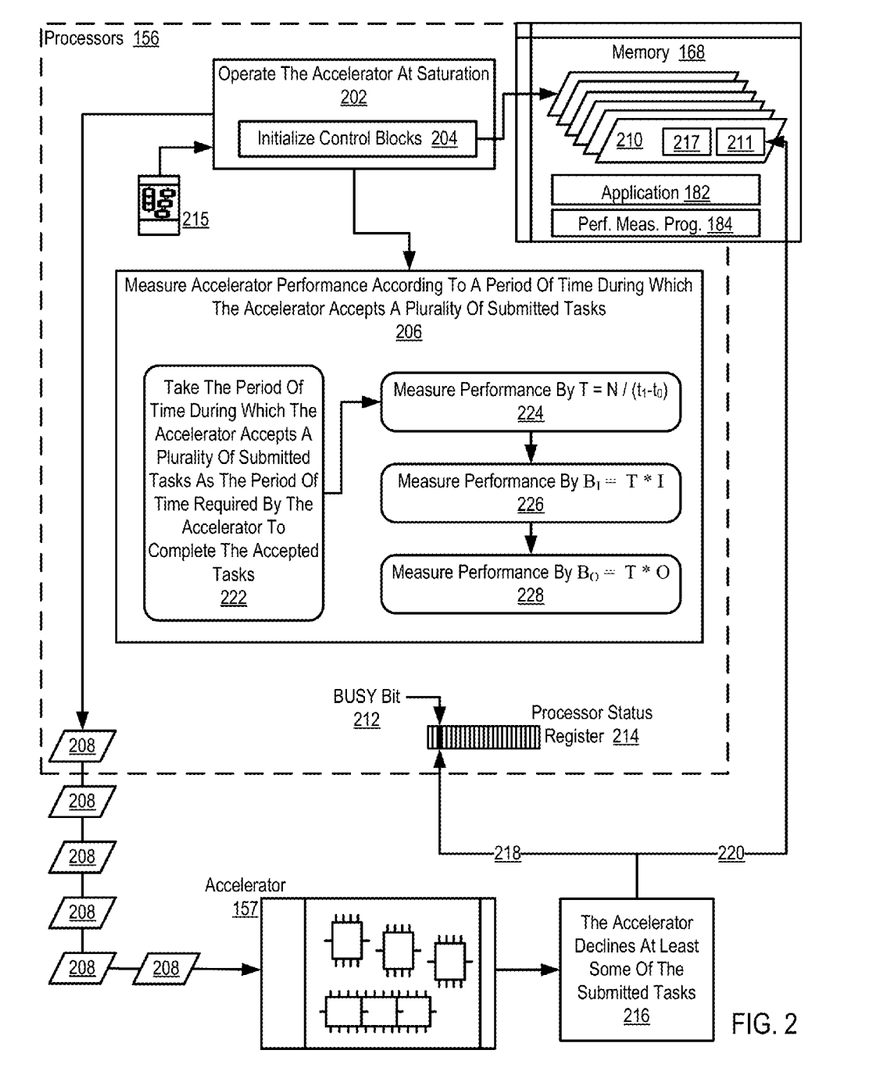
FIG. 2 sets forth a flow chart illustrating an example method of performance measurement of hardware accelerators.

For further explanation, FIG. 2 sets forth a flow chart illustrating an example method of performance measurement of hardware accelerators according to embodiments of the present invention. The method of FIG. 2 is implemented on a computer similar to the one described above with reference to FIG. 1, a computer that includes one or more computer processors (156) operably coupled to at least one hardware accelerator (157). In the method of FIG. 2, the processors operate the accelerator at saturation, that is, by submitting data processing tasks (208) to the accelerator at a rate that saturates the data processing resources of the accelerator, causing the accelerator to decline (216) at least some of the submitted tasks. As mentioned earlier, the submitting of the data processing tasks (208) can be carried out by one or more instances of an application program (182) executing on one or more of the processors (156), and the process of making (206) the actual measurements can be carried out by a separate performance measurement program (184).

In the example of FIG. 2, operating (202) the accelerator at saturation includes initializing (204) a control block (210) for each task submitted to the accelerator. As mentioned earlier, each control block is a structure that describes a task submitted to the accelerator. Each control block includes, for example, input buffer address, input buffer size, output buffer address, output buffer size, and status indicators—where the indications of status include a RETRY indicator (211) such as a flag or memory bit which when set indicates that the accelerator has declined the task represented by the control block in which a RETRY flag (211) is set to TRUE. That is, in the example method of FIG. 2, the accelerator (157) running at saturation declines (216) at least some of the submitted tasks (208), and the accelerator can indicate (220) which tasks are declined by setting a RETRY flag (211) in a corresponding control block (210) for each declined task. As an alternative to the use (220) of the RETRY indicator (211) in the example of FIG. 2, the accelerator (157) can indicate (218) that it has declined a submitted task by setting a BUSY bit (212) in a status register (214) on a processor.

The method of FIG. 2 also includes measuring (206), by the processors while the accelerator is operating at saturation, accelerator performance according to a period of time during which the accelerator accepts a plurality of submitted tasks. As part of operating (202) the accelerator at saturation, submitting tasks (208), and so on, a processor reads a system clock (215) and records in some or even all of the control blocks the time (217) when their corresponding tasks are submitted. Knowing that N tasks (208) are to be submitted, a processor needs only to record submission time for the first and last tasks to establish a period of time during which the accelerator accepts a plurality of submitted tasks—rather than writing submission time for each task into each of N control blocks.

Also in the method of FIG. 2, measuring (206) accelerator performance optionally includes taking (222) the period of time during which the accelerator accepts a plurality of submitted tasks as the period of time required by the accelerator to complete the accepted tasks. This is feasible, taking acceptance time as completion time, because when running at saturation, the accelerator must complete a task in order to be capable of accepting a next task. In this way, acceptance time tracks completion time.

Also in the method of FIG. 2, measuring (206) accelerator performance optionally includes measuring (224) accelerator performance according to $T=N/(t_1-t_0)$, where T represents throughput expressed as accepted tasks per second; N is a number of submitted tasks accepted by the accelerator between times $t_0$ and $t_1$; $t_0$ is the time of acceptance of the first submitted task accepted after the beginning of saturated operation of the accelerator; and $t_1$ is the time of acceptance of the $N^{th}$ submitted task.

Also in the method of FIG. 2, measuring (206) accelerator performance optionally includes measuring accelerator performance according to $B_I=T*I$, where $B_I$ represents input bandwidth expressed in bytes per second; T represents throughput expressed as accepted tasks per second; and I represents an average number of input data bytes processed per accepted task.

Also in the method of FIG. 2, measuring (206) accelerator performance optionally includes measuring accelerator performance according to $B_O=T*O$, where $B_O$ represents output bandwidth expressed in bytes per second; T represents throughput expressed as accepted tasks per second; and O represents an average number of output data bytes processed per accepted task.

Figure 3:
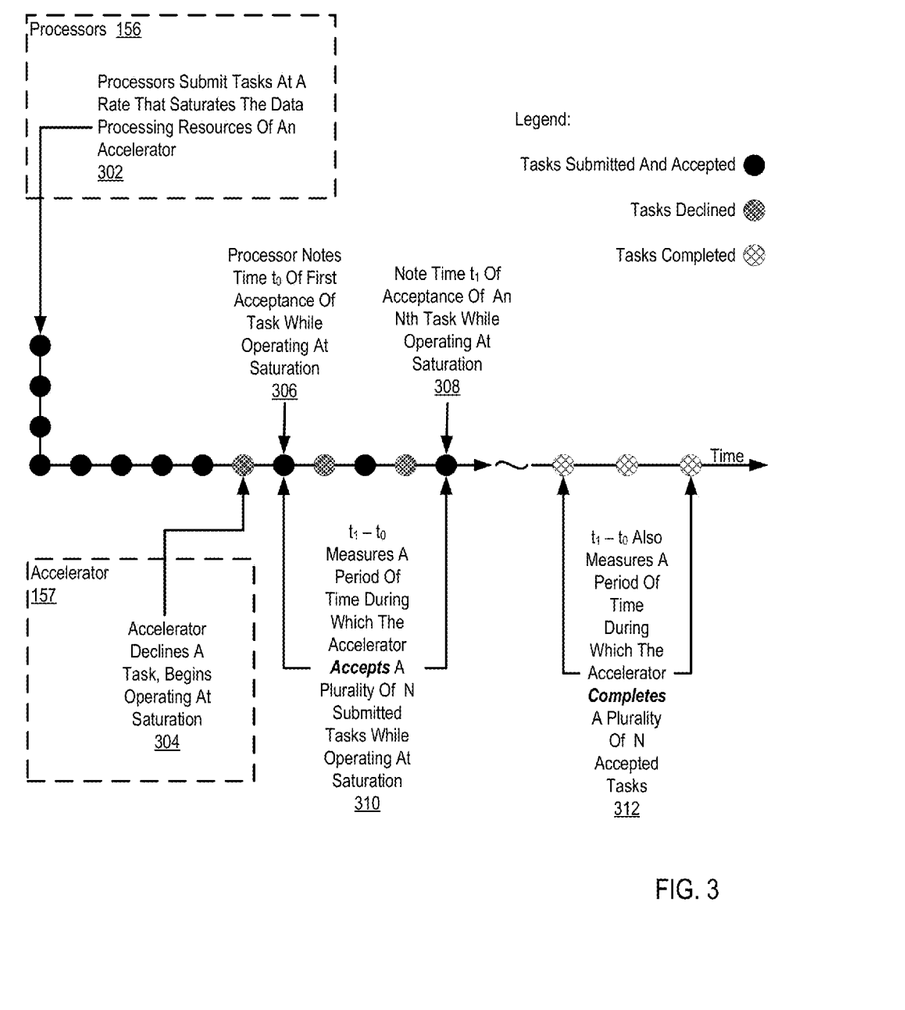
FIG. 3 sets forth a timing diagram for a further example method of performance measurement of hardware accelerators.

For further explanation, FIG. 3 sets forth a timing diagram for a further example method of performance measurement of hardware accelerators according to embodiments of the present invention. In this example of FIG. 3, one or more computer processors (156) submit (302) a number of data processing tasks to an accelerator (157) fast enough to saturation the accelerator. In FIG. 3, submitted tasks are indicated by black dots, declined tasks by cross-hatched gray dots, and completed tasks by cross-hatched white dots. In order to be able to make submissions quickly, an application may have to prepare all the necessary control blocks for many tasks ahead of time, and then make the submissions to the accelerator in a tight loop. In order to be able to make submissions fast enough to saturate an accelerator, multiple instances of an application may be needed to run on more than one processor.

After some number of tasks are accepted, the accelerator cannot take on more work because its resources (such as internal task queue or input buffers) are full. At that point the accelerator declines (304) a submitted task by, for example, setting a BUSY bit in a processor register or setting a RETRY flag in a control block. This feedback is needed by default for a submitting application to know whether its submitted task was correctly accepted. The application uses this response to also recognize that the accelerator has likely reached its performance limit. That is, at this point in timing (304), the accelerator begins saturated operation. After this point (304), when a next task succeeds in acceptance (306), the processor under application control notes the time, $t_0$, from a timer register, that is, from a system clock. After the processor has successfully submitted some number of tasks N, it again makes note of the time $t_1$ (308). The difference between $t_1$ and $t_0$ represents a period of time during which the accelerator accepted a plurality of N submitted tasks while operating at saturation (310).

What we find, however, is that this acceptance time between $t_1$ and $t_0$ also tracks the actual difference in completion times (312) between tasks. The reason this happens is because acceptance of a task at time $t_0$, must coincide with the real completion of an earlier task from the accelerator. This is because a task could not be immediately accepted by the accelerator on an earlier attempt. Therefore, the only way that task could be accepted is after some other task completed. The acceptance rate to a saturated accelerator therefore can be used to measure completion rate at the accelerator.

Figure 4:
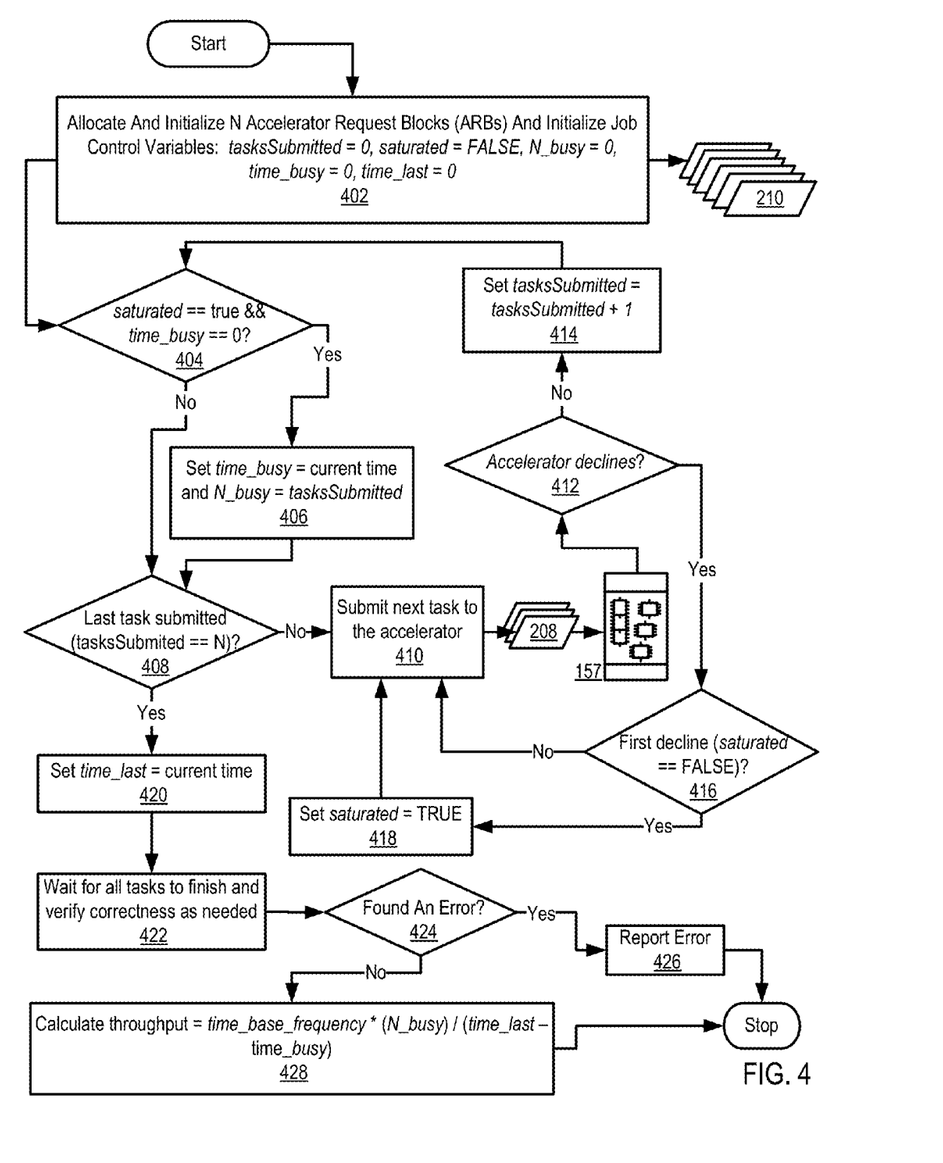
FIG. 4 sets forth a flow chart illustrating a further example method for performance measurement of hardware accelerators.

For further explanation, FIG. 4 sets forth a flow chart illustrating a further example method for performance measurement of hardware accelerators according to embodiments of the present invention. At the beginning of the method of FIG. 4, N accelerator-specific control block structures (210), also known as the Coprocessor Request Blocks or CRBs, corresponding to N tasks to be submitted for acceleration are pre-allocated and initialized in memory (402). N should be chosen such that it is large enough to overflow the accepted task queue of the target accelerator. If this information is not available, several experiments with logarithmically increasing N may be needed in order to identify what N comfortably saturates the accelerator. Saturating the accelerator refers to the situation where the accelerator queues fill up and it responds with a BUSY or a RETRY signal, and does not accept the submitted task.

The tasks (208) are submitted (410) to the accelerator a tight loop, fast enough to saturate the accelerator. This step may require multiple threads to be engaged in order to get to a sufficiently high submission rate that can saturate the accelerator. After each task is submitted, the status of the task is determined (412), perhaps by reading a status register, such as for example, CR0 in IBM PowerPC™ processors. If the status register indicates that the task was accepted then the method increments (414) the count of successfully submitted tasks and continue with the next task. If the task is the first to be accepted after the accelerator has reached saturation condition, that is, variable "saturated" is true, then the current time is noted by reading in the time base register value of the system clock into a "time_busy" variable (404, 406). The condition register status may also indicate that the accelerator could not accept the task because it was BUSY. In that case the method of FIG. 4 would include resubmitting a declined task.

In addition if a task is the first task to get such a BUSY response, that is, the variable "saturated" initialized to FALSE is still FALSE (416), then the variable "saturated" is set to true (418). After one or more retries, when the task is accepted by the accelerator, the variable "time_busy" is used to record the current time from time register value of a system clock (406). This is the first time a task was accepted by the accelerator after reaching the saturation condition. In addition, the variable "N_busy" is set to the value of the "tasksSubmitted" variable at this time. This variable identifies the first task, out of the total of N tasks, that encountered the BUSY signal from the accelerator before being accepted by the accelerator. Task submission continues until all N tasks are accepted. For the last task submitted and accepted (408) the system time value is recorded into the variable "time_last" by reading a time register (420). After all tasks are accepted the method waits (422) for all tasks to complete.

The results are checked for errors (424). If there are errors, the errors are reported (426) and the test case, the application, or the hardware is debugged. If, however, there are no errors, which is the typical scenario if the underlying hardware and application is working correctly, then the accelerator throughput performance in operations per second is calculated (428) with this formula:

$$\text{Throughput in tasks per second} = (N - N\_busy) * \text{time\_base\_frequency} / (\text{time\_last} - \text{time\_busy}).$$

The time_base_frequency refers to the number of timer ticks per second. The input and output bandwidth in terms of bytes per second can be further calculated based on the knowledge of how much input and output data an average task works with. The formulae are shown here:

$$\text{Input\_Bandwidth in bytes per second} = \text{Throughput} * \text{average input data bytes processed per task}$$
$$\text{Output\_Bandwidth in bytes per second} = \text{Throughput} * \text{average output data bytes generated per task}$$

Example embodiments of the present invention are described largely in the context of a fully functional computer system for performance measurement of hardware accelerators. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performance measurement of hardware accelerators in a computer, the computer comprising one or more computer processors operably coupled to at least one hardware accelerator, the method comprising:

operating, by the one or more computer processors, the accelerator at saturation, submitting data processing tasks by the one or more computer processors to the accelerator at a rate that saturates the data processing resources of the accelerator, causing the accelerator to decline at least some of the submitted tasks; and while the accelerator is operating at saturation, measuring, by the one or more computer processors, accelerator performance by:

establishing a period of time during which the accelerator accepts a plurality of submitted tasks; and determining a throughput of accepted tasks per unit of time; and wherein measuring accelerator performance further comprises measuring accelerator performance according to $T=N/(t_1-t_0)$, wherein T represents the throughput expressed as accepted tasks per second;

N is a number of submitted tasks accepted by the accelerator between times $t_0$ and $t_1$;

$t_0$ is the time of acceptance of the first submitted task accepted after the beginning of saturated operation of the accelerator; and $t_1$ is the time of acceptance of the $N^{th}$ submitted task.

2. The method of claim 1 wherein measuring accelerator performance further comprises taking by the one or more computer processors the period of time during which the accelerator accepts the plurality of submitted tasks as the period of time required by the accelerator to complete the accepted tasks.

3. The method of claim 1 wherein:

submitting the data processing tasks further comprises submitting the data processing tasks to the accelerator by one or more instances of an application program executing on one or more of the processors; and measuring accelerator performance further comprises measuring accelerator performance by a performance measurement program executing on at least one of the processors.

4. The method of claim 1 further comprising setting by the accelerator a bit in a processor status register to indicate that the accelerator declines a submitted task.

5. Apparatus for performance measurement of hardware accelerators, the apparatus comprising:

one or more computer processors operably coupled to at least one hardware accelerator;

a computer memory operatively coupled to the one or more computer processors, the computer memory having disposed within it computer program instructions capable, when executed by the computer processor, of causing the apparatus to function by:

operating, by the one or more computer processors, the accelerator at saturation, submitting data processing tasks by the one or more computer processors to the accelerator at a rate that saturates the data processing resources of the accelerator, causing the accelerator to decline at least some of the submitted tasks; and while the accelerator is operating at saturation, measuring, by the one or more computer processors, accelerator performance according to by:

establishing a period of time during which the accelerator accepts a plurality of submitted tasks; and determining a throughput of accepted tasks per unit of time; and wherein measuring accelerator performance further comprises measuring accelerator performance according to $T=N/(t_1-t_0)$, wherein:

T represents the throughput expressed as accepted tasks per second;

N is a number of submitted tasks accepted by the accelerator between times $t_0$ and $t_1$;

$t_0$ is the time of acceptance of the first submitted task accepted after the beginning of saturated operation of the accelerator; and $t_1$ is the time of acceptance of the $N^{th}$ submitted task.

6. The apparatus of claim 5 wherein measuring accelerator performance further comprises taking by the one or more computer processors the period of time during which the accelerator accepts the plurality of submitted tasks as the period of time required by the accelerator to complete the accepted tasks.

7. The apparatus of claim 5 wherein:

submitting the data processing tasks further comprises submitting the data processing tasks to the accelerator by one or more instances of an application program executing on one or more of the processors; and measuring accelerator performance further comprises measuring accelerator performance by a performance measurement program executing on at least one of the processors.

8. The apparatus of claim 5 further comprising the accelerator configured so that the accelerator sets a bit in a processor status register to indicate that the accelerator declines a submitted task.

9. A computer program product for performance measurement of a hardware accelerator, the accelerator operably coupled to one or more computer processors, the computer program product disposed upon a computer readable storage medium, wherein the computer readable storage medium is not a signal, the computer program product comprising computer program instructions capable, when executed, of causing the processors to function by:

operating, by the one or more computer processors, the accelerator at saturation, submitting data processing tasks by the one or more computer processors to the accelerator at a rate that saturates the data processing resources of the accelerator, causing the accelerator to decline at least some of the submitted tasks; and while the accelerator is operating at saturation, measuring, by the one or more computer processors, accelerator performance by:

establishing a period of time during which the accelerator accepts a plurality of submitted tasks; and determining a throughput of accepted tasks per unit of time; and wherein measuring accelerator performance further comprises measuring accelerator performance according to $T=N/(t_1-t_0)$, wherein T represents the throughput expressed as accepted tasks per second;

N is a number of submitted tasks accepted by the accelerator between times $t_0$ and $t_1$;

$t_0$ is the time of acceptance of the first submitted task accepted after the beginning of saturated operation of the accelerator; and $t_1$ is the time of acceptance of the $N^{th}$ submitted task.

10. The computer program product of claim 9 wherein measuring accelerator performance further comprises taking by the one or more computer processors the period of time during which the accelerator accepts the plurality of submitted tasks as the period of time required by the accelerator to complete the accepted tasks.

11. The computer program product of claim 9 wherein:

submitting the data processing tasks further comprises submitting the data processing tasks to the accelerator by one or more instances of an application program executing on one or more of the processors; and measuring accelerator performance further comprises measuring accelerator performance by a performance measurement program executing on at least one of the processors.

* * * * *